(12) United States Patent
Orsini et al.

(10) Patent No.: US 8,381,790 B2
(45) Date of Patent: Feb. 26, 2013

(54) SIDE SEALING MODULE WITH SEAL COMPRESSION

(75) Inventors: Thomas P. Orsini, Leominster, MA (US); Joseph T. Powers, Billerica, MA (US); John A. Dextraze, Fitchburg, MA (US)

(73) Assignee: Shanklin Corporation, Ayer, MA (US)

( * ) Notice: Subject to any disclaimer, the term of this patent is extended or adjusted under 35 U.S.C. 154(b) by 437 days.

(21) Appl. No.: 12/700,779

(22) Filed: Feb. 5, 2010

(65) Prior Publication Data

US 2011/0192119 A1 Aug. 11, 2011

(51) Int. Cl.
| | |
|---|---|
| B29C 65/00 | (2006.01) |
| B29C 65/02 | (2006.01) |
| B30B 5/00 | (2006.01) |
| B30B 5/02 | (2006.01) |
| B30B 5/04 | (2006.01) |
| B30B 5/06 | (2006.01) |
| B32B 37/00 | (2006.01) |
| B32B 37/04 | (2006.01) |

(52) U.S. Cl. ............ 156/583.3; 156/250; 156/252; 156/253; 156/256; 156/311; 156/312; 156/580; 156/583.1; 156/583.2; 156/583.5

(58) Field of Classification Search ........... 156/580, 156/583.1, 583.2, 583.3, 250, 252, 253, 256, 156/311, 312, 583.5
See application file for complete search history.

(56) References Cited

U.S. PATENT DOCUMENTS

| | | | | |
|---|---|---|---|---|
| 3,444,732 | A | * | 5/1969 | McKinley et al. ........... 73/150 A |
| 3,826,701 | A | * | 7/1974 | Miller ............................ 156/359 |
| 3,925,139 | A | * | 12/1975 | Simmons ...................... 156/358 |
| 4,260,447 | A | * | 4/1981 | Muscariello .................. 156/494 |
| 4,680,073 | A | | 7/1987 | Brunner et al. |
| 5,184,447 | A | * | 2/1993 | Johnsen ........................ 53/373.9 |
| 5,282,349 | A | | 2/1994 | Siegel |
| 5,341,623 | A | | 8/1994 | Siegel |
| 5,761,878 | A | | 6/1998 | Walkiewicz, Jr. et al. |
| 6,604,340 | B2 | * | 8/2003 | Liao .............................. 53/373.7 |
| 6,932,134 | B2 | * | 8/2005 | Selle et al. .................... 156/497 |

* cited by examiner

*Primary Examiner* — Mark A Osele
*Assistant Examiner* — Christopher C Caillouet
(74) *Attorney, Agent, or Firm* — Nields, Lemack & Frame, LLC

(57) ABSTRACT

The present invention describes an improved side-sealing machine for use with heat sealable films. Briefly, a cutting and sealing element is located between a set of cooperating guide and alignment members. The downstream guide and alignment member also includes a compression mechanism. This compression mechanism serves to compress the seal created upstream, and to draw the heat away from the film. In some embodiments, the downstream guide and alignment member also serves to separate the film into a surplus portion and a remaining portion, where only the remaining portion is subjected to compression.

16 Claims, 7 Drawing Sheets

SIDE SEALING MODULE WITH SEAL COMPRESSION

BACKGROUND OF THE INVENTION

Machines used to wrap and seal articles and packages in thermoplastic film are well known in the art. Two types of machines are commonly referred to as side-sealing and lap-sealing machines. In the typical side-sealing configuration, an article or set of articles travels, typically via a conveyer belt, toward the machine. A sheet of center-folded plastic film, having two layers, is fed from a direction which is preferably perpendicular to the direction of the conveyer. The two layers of the film are then separated such that the article is placed between the lower layer and the upper layer. On one side of the article is the center-fold, while on the other side, there is an open edge where the two layers are not attached. The machine has a side sealing mechanism, which typically comprises several sets of belts to hold and guide the film, a heating/sealing element that fuses or welds the two free layers together and a cutting element that removes the excess material. Thus, as the article passes by the side sealing mechanism, this open edge is sealed by welding the two layers together, the plastic is cut and the waste is removed and discarded. At this point, the plastic film resembles a tube, with openings at both the leading and trailing ends of the article, but sealed along both sides. As the article continues to advance, an end sealing mechanism is then employed to seal the film at the leading end of the article. The article is further advanced and the end sealing mechanism then seals the film at the trailing end of the article.

The sealing and cutting performed by the side sealing unit can be done in a variety of ways. Some of these methods include hot air, hot knife, hot wire, band sealing and hot wheel. The first three approaches (hot air, hot knife and hot wire) accomplish the cutting and sealing processes without the use of pressure. In contrast, the band system compresses the film between two hot blocks and then a cut is made subsequent to the sealing process. Finally, the hot wheel system includes a heated wheel with a blade in the center that cuts the film.

In addition to high quality seals, the throughput of the system is also a concern. Many different types of sealing and cutting processes can be used, which perform well at low speeds, such as less than 40 feet per minute. However, at high speeds, such as 60 feet per minute, it becomes difficult to create good quality seals. This problem is exacerbated by thicker films, which require more heat to properly seal, and are obviously more difficult to cut through.

A side sealing machine that can operate at high speed and perform high quality seals, even on thick films, would be very beneficial. Such a machine would allow increased throughput and higher quality. In addition, a method of cutting and sealing a film which allows high quality seals and high throughput would be advantageous.

SUMMARY OF THE INVENTION

The problems associated with the prior art have been overcome by the present invention, which describes an improved side-sealing machine for use with thick films. Briefly, a cutting and sealing element is located between a set of cooperating guide and alignment members. The downstream guide and alignment member also includes a compression mechanism. This compression mechanism serves to compress the seal created upstream, and to draw the heat away from the film. In some embodiments, the downstream guide and alignment member also serves to separate the film into a surplus portion and a remaining portion, where only the remaining portion is subjected to compression.

DETAILED DESCRIPTION OF THE INVENTION

Figure 1:
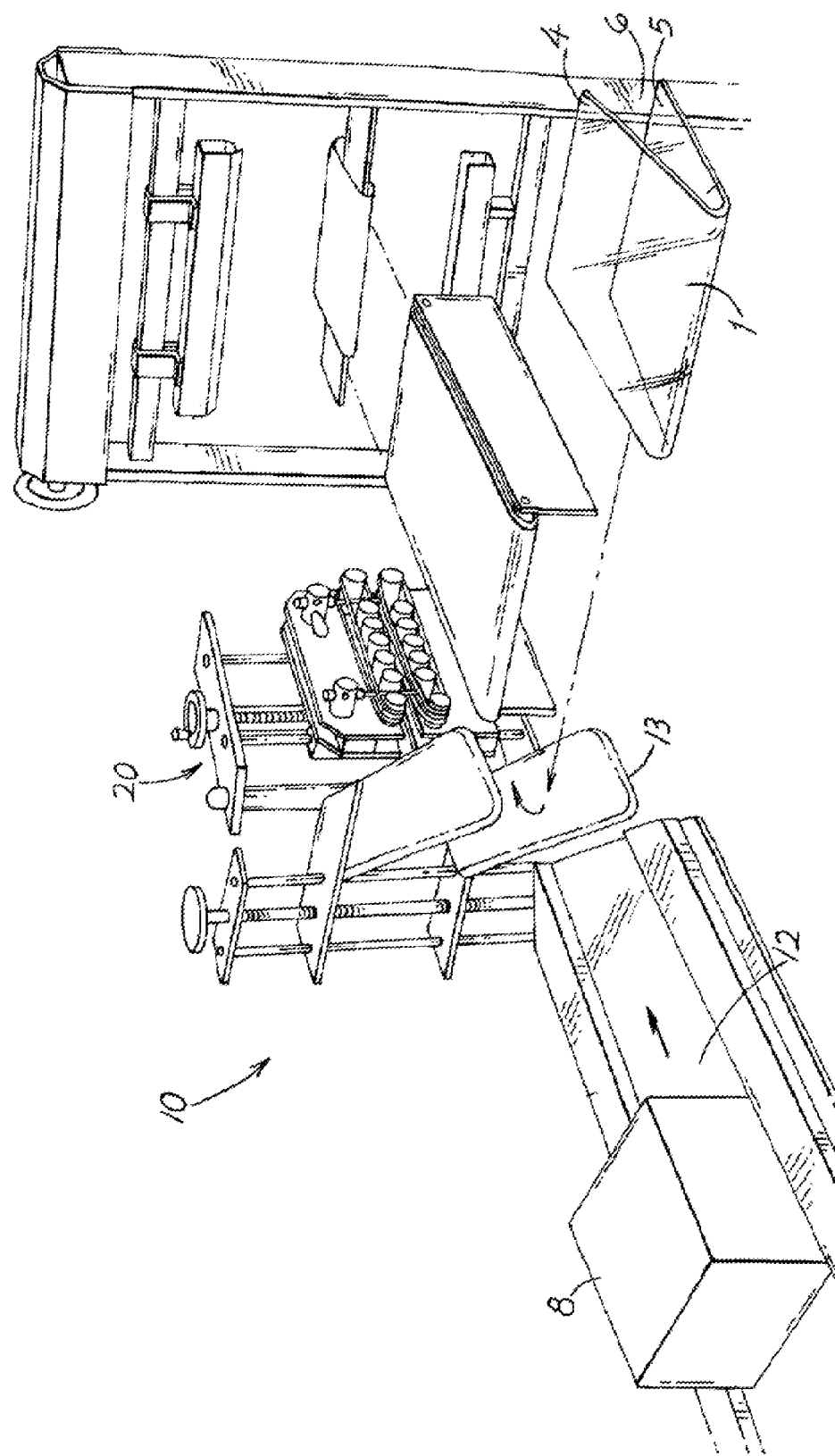
FIG. 1 illustrates a representative side-sealing machine of the prior art.

FIG. 1 illustrates a representative side-sealing machine used to encapsulate or wrap an article in thermoplastic film, as described in U.S. Pat. No. 6,526,728. The machine 10 utilizes a conveyer belt 12 operating at a relatively constant speed to deliver articles 8 that are to be encapsulated. The thermoplastic film 1 is center-folded, such that the side with the fold is closed, while the opposite side 6 is open. On this opposite side, there are two layers of film 4,5, which will later be sealed. This center-folded thermoplastic film 1 is fed from a reel (not shown) that is preferably mounted perpendicular to the direction of travel of the conveyer belt 12. The film is then inverted and separated by an inverter 13 such that the article is enveloped between the two layers 4,5. At this point, the film 1 on one side of the article is closed, while the opposite side 6 remains open. Also, the film at both the leading and trailing ends of the article is not sealed. Downstream from the inverter is the side-sealing mechanism 20. After proper relative positioning of the article between the layers of the film 4,5, the enveloped article approaches the side-sealing mechanism 20.

The side-sealing mechanism 20 is located on the open side 6 of the enveloped article. The mechanism holds the two layers of film 4,5 together, and guides the layers through the sealing and cutting elements. It then welds the two layers together, and cuts off the surplus material. The surplus material is pulled away so as not to reattach to the film while it is still at an elevated temperature.

Figure 2:
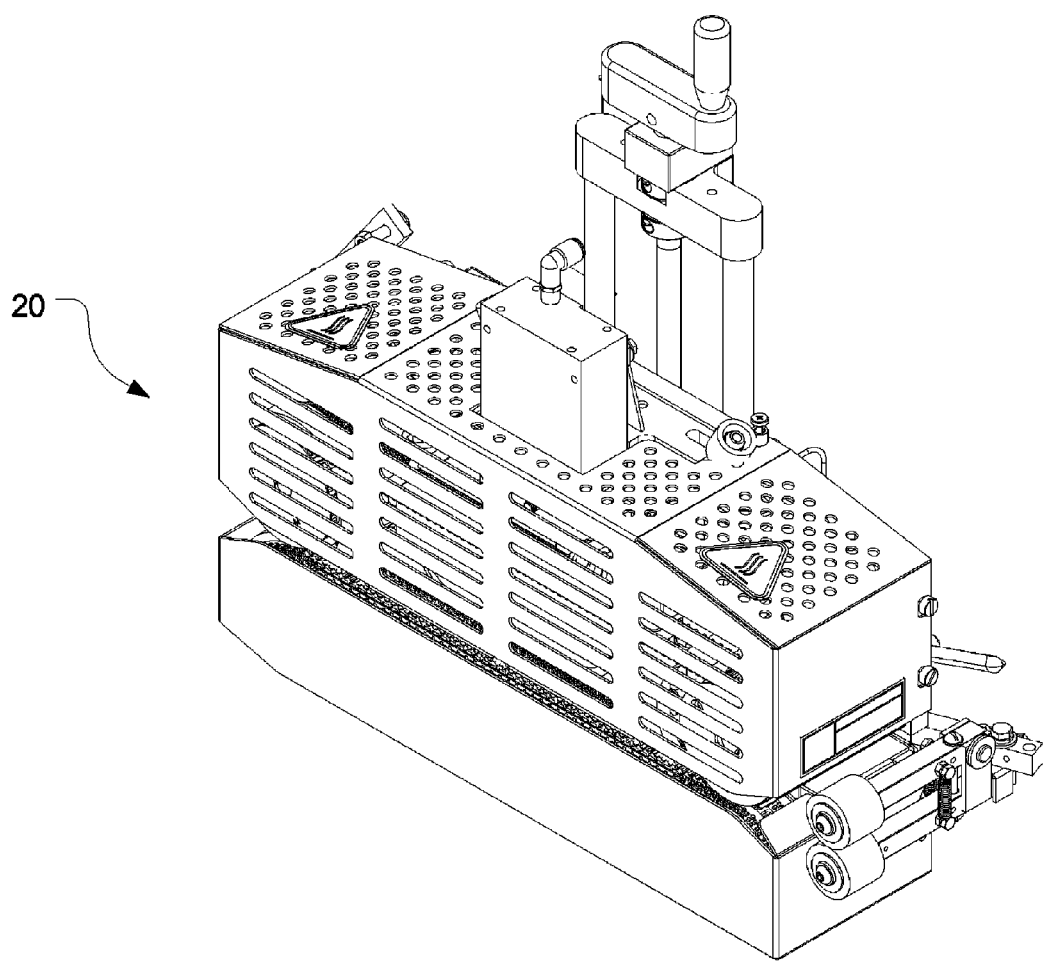
FIG. 2 illustrates a side-sealing mechanism in accordance with the present invention.
Figure 3:
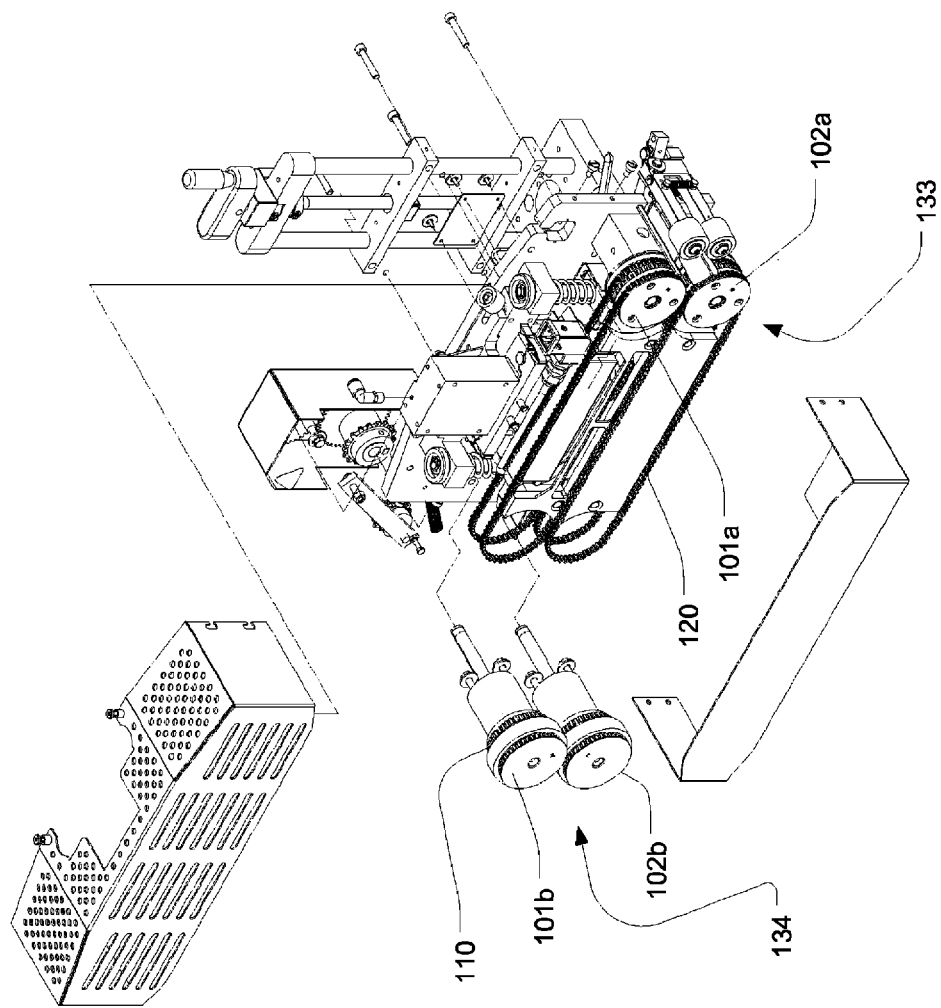
FIG. 3 illustrates an exploded view of the side-sealing mechanism shown in FIG. 2.

FIG. 2 shows the mechanism 20 used to perform the side sealing operation. FIG. 3 shows an exploded view of the mechanism 20 of FIG. 2. The side sealing mechanism 20 preferably comprises two sets of cooperating pulleys, an upper set 101 and a lower set 102. These sets work in unison to pull the two layers of film into the mechanism and hold the layers in place. In the preferred embodiment, each of the pulleys has teeth 110 in its channel so as to accept one or more, preferably two, timing belts 120. The presence of teeth 110 ensures that the timing belt does not slip relative to the pulleys; a common problem with the prior art. In other embodiments, belts without inner teeth may be used. The first set of pulleys 101a,101b is located above the layers of film, while the second set 102a,102b is located below the layers. The forward set of pulleys 101a, 102a comprises a first guide and alignment member 133. This guide and alignment mechanism 133 also serves to pull the film into the side sealing mechanism 20. The rear set of pulleys 101b, 102b comprise a second guide and alignment member 134. There may optionally be one or more idler pulleys (not shown). Each of these pulleys may also have one or more O-rings mounted in the channel where the belts are located, so as to provide individual channels for each of the timing belts 120. One or more of the pulleys that comprise the first and second guide and alignment members 101a, 101b, 102a, 102b may be driven, such as by an electric motor contained within the side sealing mechanism. In some embodiments, all of the pulleys are driven. In other embodiments, fewer are actively driven by a motor, and the remaining pulleys rotate due to their coupling to the driven pulleys (such as via a belt). In certain embodiments, the front set of pulleys 101a, 102a are actively driven by a motor, while the back set of pulleys 101b, 102b may or may not be actively driven. In other embodiments, the rear set of pulleys 101b, 102b are actively driven by a motor, while the front set of pulleys 101a, 102a may or may not be actively driven.

Figure 4:
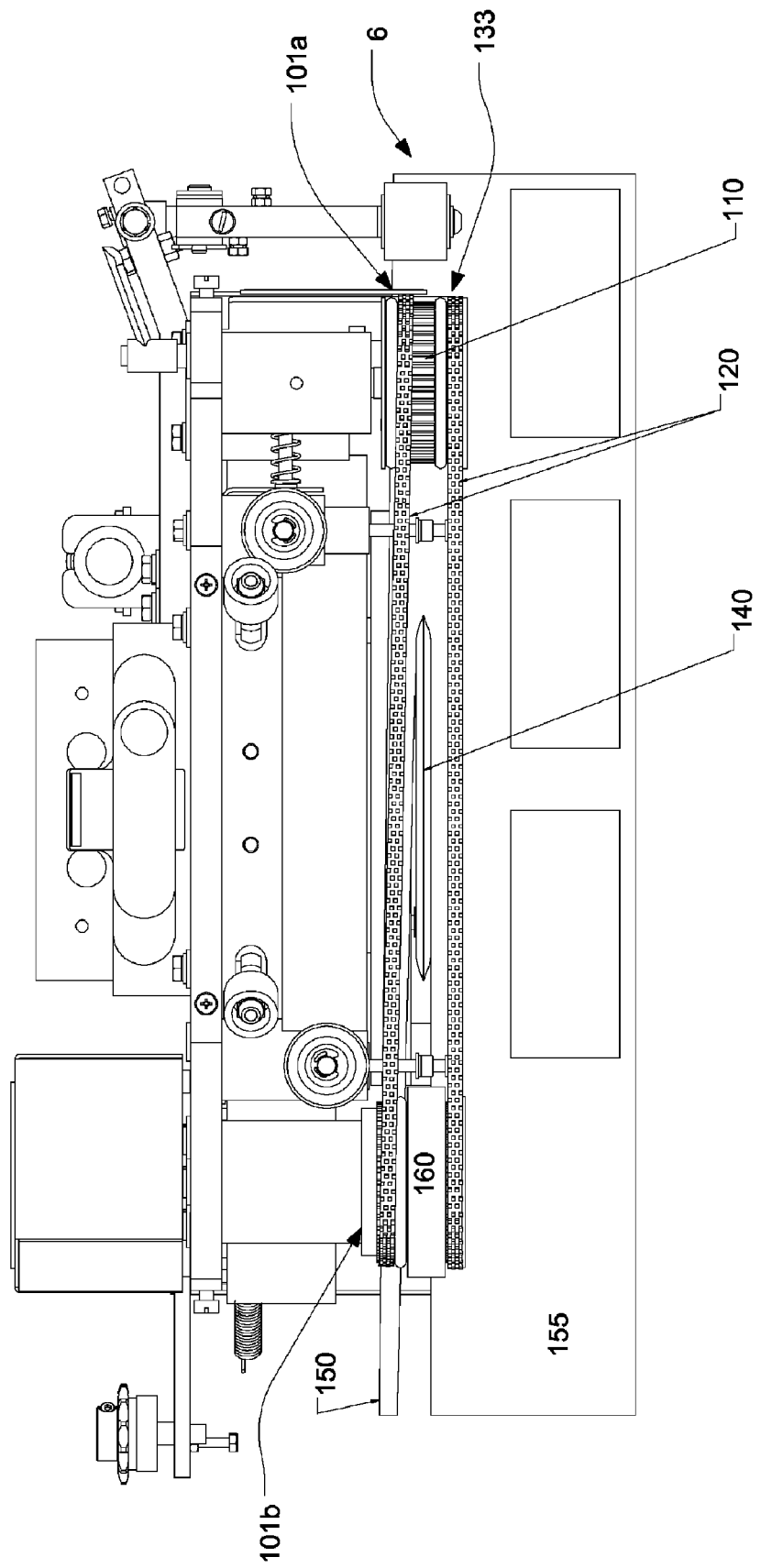
FIG. 4 illustrates a top view of the side-sealing mechanism shown in FIG. 2.

A sealing and cutting element 140 is located between the first and second guide and alignment members 133, 134, as best seen in FIG. 4.

FIG. 4 shows a top view of the side sealing mechanism 20. In this figure, only the upper pulleys 101a, 101b are visible. The open end 6 of the film is fed into the first guide and alignment member 133. As described above, there are preferably two belts 120 which surround upper pulleys 101a, 101b. These belts 120 may be parallel to one another. In other embodiments, the belts 120 are not parallel to one another. In the preferred embodiment, as shown in FIG. 4, the belts grow farther apart moving from the first pulley 101a to the second pulley 101b. In other words, the belts diverge from the first pulley 101a to the second pulley 101b. The film is cut by heating and cutting element 140, which is located between the first and second guide and alignment members 133, 134. The cutting element 140 divides the film into a surplus portion 150, and a remaining portion 155. The surplus portion 150 is guided by the inner belts 120 (relative to the sealing mechanism) away from the opposing rollers 160, such that only the remaining portion 155 is compressed by the opposing rollers 160.

Thus, the second guide and alignment member 134 has several functions. First, it helps guide the film through the side sealing mechanism 20. Second, it separates the cut film into surplus film 150 and a remaining portion 155, through the use of channels which force the belts 120 to be non-parallel. The second guide and alignment member 134 also has opposing rollers, which compress the still-hot remaining portion 155 to insure a better seal. Finally, the opposing rollers 160 removes heat from the remaining portion 155 as they compress it.

Figure 5:
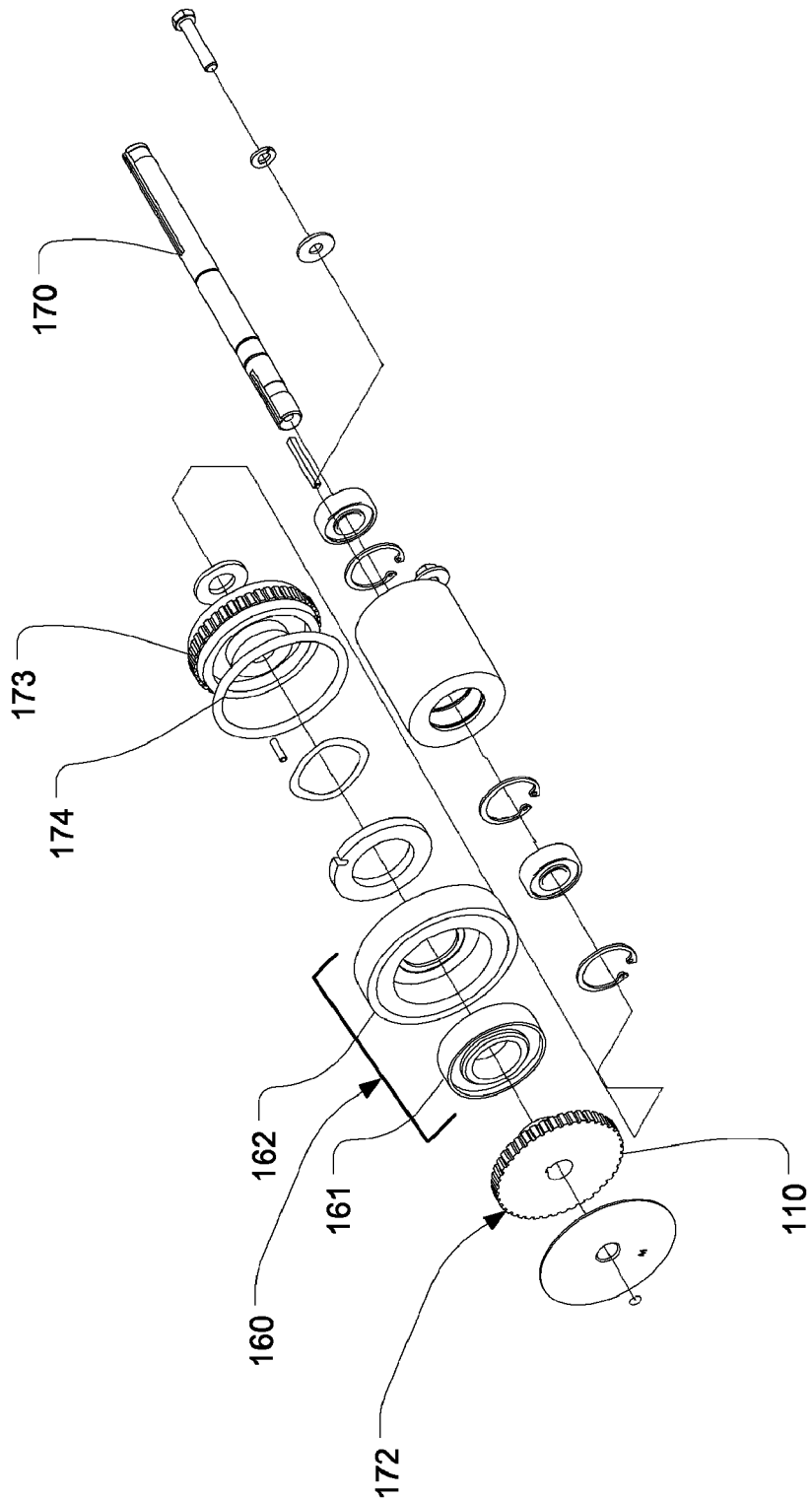
FIG. 5 illustrates an exploded view of one embodiment of a component of the second guide and alignment member.

FIG. 5 shows an expanded view of one pulley 101b of the second guide and alignment member 134. The components shown include a center axle 170. A number of additional components are mounted on the center axle 170. In this embodiment, the pulley channel is separated into two parts 172, 173. These two channel parts 172, 173 are placed on either side of opposing roller 160. As seen in FIG. 5, the channel parts 172, 173 are formed with teeth that facilitate the use of a timing belt to minimize the slippage of the belts 120. As noted above, it is possible to use belts without inner teeth if desired. The belts 120 are each adapted to surround one of these two channel parts, and are therefore separated from one another by the opposing roller 160. Since the opposing roller 160 is positioned between the two channel parts, it may not be necessary to have O-rings, as described above. In some embodiments, only one O-ring 174 is used to further separate the belts 120 as they loop around pulleys 101b, 102b.

Although not shown, the pulley channel can be designed as a single component, and the opposing roller can be designed to fit over the channel component, rather than between channel components 172, 173.

Figure 6:
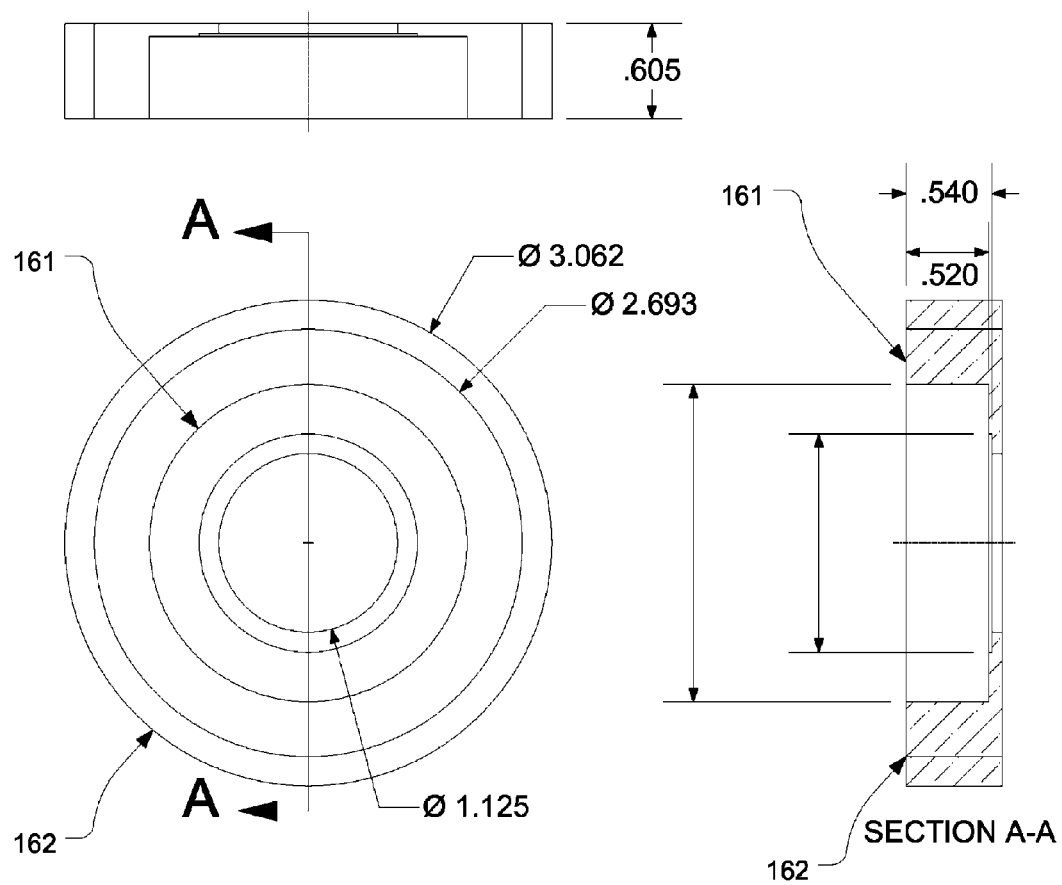
FIG. 6 illustrates one embodiment of the opposing roller of the present invention.

The opposing rollers 160 may be fabricated in a number of ways. As is also shown in FIG. 6, the opposing roller 160 may be made up of a core 161, and an annular ring 162 surrounding the core 161. In this embodiment, the core is roughly circular, with a radius of about 2.693 inches. The annular ring 162 has an inner radius that roughly matches the outer radius of the core 161 and an outer radius of 3.062 inches. In some embodiments, the core 161 is made of metal, such as aluminum or steel, although other suitable materials can be used. In some embodiments, the annular ring is constructed of a pliable material, such as rubber, including neoprene or urethane rubber, or metal, such as steel or aluminum. In other embodiments, the core 161 may be a pliable material, while the annular ring is constructed of metal. The combination of a metal core with a pliable annular ring (or a pliable core with a metal annular ring) serves several purposes. First, the metal material is an excellent thermal conductor, and therefore is able to draw heat away from the film as it is being compressed. In some embodiments, the temperature of the film entering the opposing rollers 160 is over 110° F., while the temperature of the film exiting the opposing rollers is roughly 85° F. Thus, the opposing rollers 160 help to cool the film, which further enhances the seal. The rubber material allows the opposing rollers to be positioned to be in interference with each other. The pliability of the rubber allows the rollers to adapt to various film thicknesses. By positioning the opposing rollers 160 this way, the seal is also compressed as it is being cooled.

Figure 7:
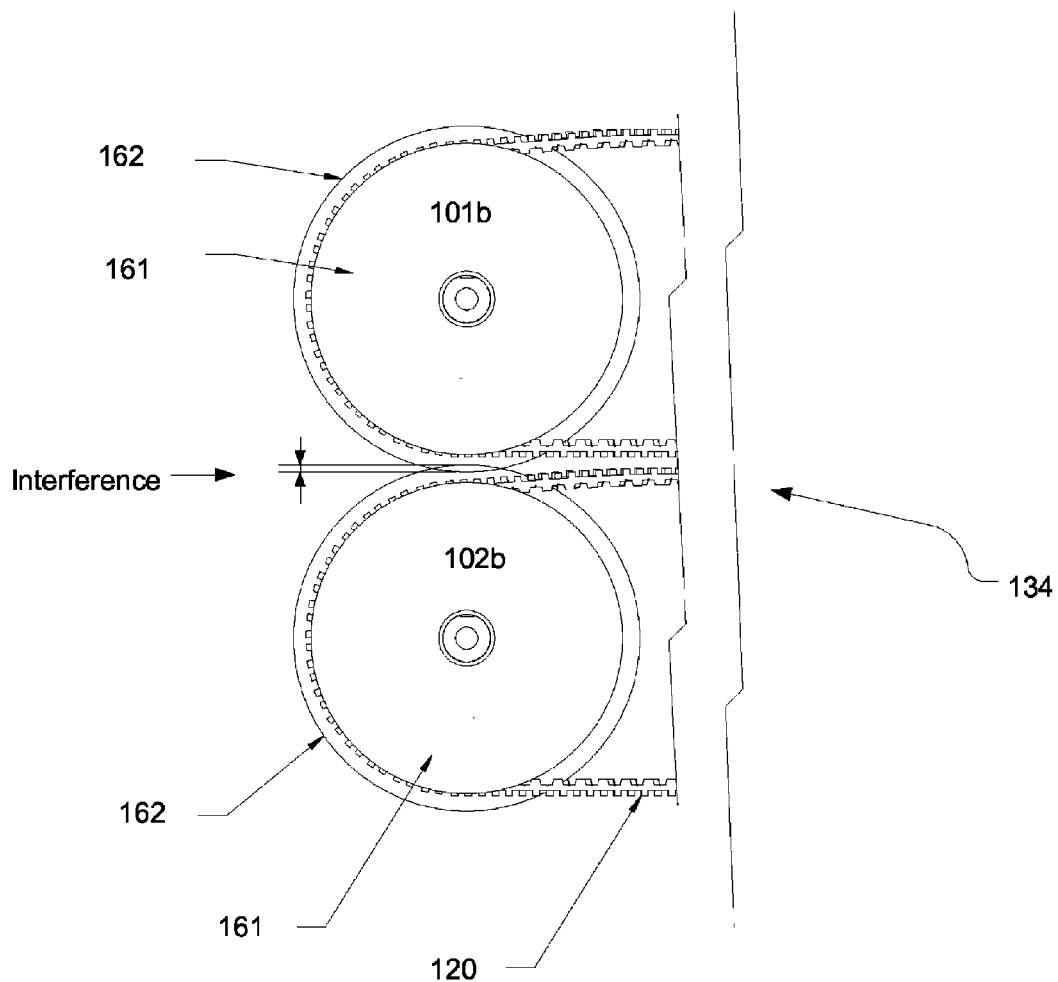
FIG. 7 shows the second guide and alignment member in accordance with one embodiment of the present invention.

FIG. 7 shows the second guide and alignment mechanism 134, and specifically the rear pulleys 101b, 102b. As can be seen in the Figure, the pulleys 101b, 102b are positioned such that there is a guaranteed interference between the two rollers, even in the absence of a film. In some embodiments, the interference is about 0.063 inches. This interference, using urethane rubber creates a pressure of 54 PSI between the opposing rollers, without the presence of any film. This pressure increases with film thickness. In other embodiments, the interference is caused to create pressure greater than about 1 PSI, preferably more than about 20 PSI.

The use of this side sealing mechanism 20 allows for increased throughput, especially of thicker films. For example, using a conventional side sealer, 3 mil thick film can be cut and sealed at speeds less than 40 feet per minute. Using the opposing rollers, which serve to compress and cool the seal, speeds in excess of 60 feet per minute were achieved.

The terms and expressions which have been employed herein are used as terms of description and not of limitation, and there is no intention in the use of such terms and expressions of excluding any equivalents of the features shown and described (or portions thereof). It is also recognized that various modifications are possible within the scope of the claims. Other modifications, variations, and alternatives are also possible.

Accordingly, the foregoing description is by way of example only and is not intended as limiting.

What is claimed:

1. A machine adapted to encapsulate an article in a heat sealable film comprising:
    first guide and alignment members, comprising a first upper pulley and a first lower pulley;
    second guide and alignment members comprising a second upper pulley and a second lower pulley;

a first set of belts surrounding said upper pulley of said first guide and alignment member and said upper pulley of said second guide and alignment member;

a second set of belts surrounding said lower pulley of said first guide and alignment member and said lower pulley of said second guide and alignment member, wherein said first set of belts surrounding said upper pulleys diverge from one another and said second set of belts surrounding said lower pulleys diverge from one another;

said second guide and alignment members further comprising a first opposing roller disposed on said second upper pulley and disposed between said first set of belts and a second opposing roller disposed on said second lower pulley and disposed between said second set of belts; and a heating and cutting element positioned between said first and second guide and alignment members, such that said first and second sets of belts hold and guide said film as it moves past said first set of guide and alignment members, is then cut by said heating and cutting element, and then passes through said second guide and alignment members, where said opposing rollers are configured to compress and cool the cut film.

2. The machine of claim 1, wherein said first and second sets of belts comprise an inner belt and an outer belt, and wherein said inner belt guides surplus film that has been cut away from the remaining portion of said film.

3. The machine of claim 2, wherein said opposing rollers compress said remaining portion of said film, and do not compress said surplus film.

4. The machine of claim 1, wherein said opposing rollers apply at least 1 PSI to said film.

5. The machine of claim 1, wherein said opposing rollers comprise a core and an annular ring surrounding said core.

6. The machine of claim 5, said core comprises metal and said annular ring comprises a pliable material.

7. The machine of claim 6, wherein each of said annular rings has an outer diameter dimensioned such that said opposing rollers are in interference with each other.

8. The machine of claim 6, wherein each of said annular rings has an outer dimension which extends radially beyond said belts.

9. The machine of claim 1, wherein said opposing rollers remove heat from said film as said film passes between said opposing rollers.

10. A machine adapted to encapsulate an article in a heat sealable film comprising:
first guide and alignment members;
second guide and alignment members comprising opposing rollers; and
a heating and cutting element positioned between said first and second guide and alignment members,
such that said film moves past said first set of guide and alignment members, is then cut by said heating and cutting element, and then passes through said second guide and alignment members, where said opposing rollers are configured to compress and cool the cut film;
wherein said opposing rollers comprise a core and an annular ring surrounding said core; and
wherein said core comprises a pliable material and said annular ring comprises metal.

11. A machine adapted to encapsulate an article in a heat sealable film comprising:
first guide and alignment members, comprising a first upper pulley and a first lower pulley;
second guide and alignment members comprising a second upper pulley and a second lower pulley;
a first set of belts surrounding said upper pulley of said first guide and alignment member and said upper pulley of said second guide and alignment member;
a second set of belts surrounding said lower pulley of said first guide and alignment member and said lower pulley of said second guide and alignment member;
said second guide and alignment members further comprising a first opposing roller disposed on said second upper pulley and disposed between said first set of belts and a second opposing roller disposed on said second lower pulley and disposed between said second set of belts, wherein each of said opposing rollers comprises a metal core and an annular ring, comprising a pliable material, surrounding said metal core, and wherein each of said annular rings has an outer dimension which extends radially beyond said belts; and
a heating and cutting element positioned between said first and second guide and alignment members,
such that said first and second sets of belts hold and guide said film as it moves past said first set of guide and alignment members, is then cut by said heating and cutting element, and then passes through said second guide and alignment members, where said opposing rollers are configured to compress and cool the cut film.

12. The machine of claim 11, wherein said first set of belts surrounding said upper pulleys diverge from one another and said second set of belts surrounding said lower pulleys diverge from one another.

13. The machine of claim 12, wherein said first and second sets of belts comprise an inner belt and an outer belt, and wherein said inner belt guides surplus film that has been cut away from the remaining portion of said film.

14. The machine of claim 13, wherein said opposing rollers compress said remaining portion of said film, and do not compress said surplus film.

15. The machine of claim 11, wherein said opposing rollers apply at least 1 PSI to said film.

16. The machine of claim 11, wherein said opposing rollers remove heat from said film as said film passes between said opposing rollers.

* * * * *